United States Patent
Boquet et al.

(10) Patent No.: US 8,496,441 B2
(45) Date of Patent: Jul. 30, 2013

(54) OPTIMIZED AERODYNAMIC PROFILE FOR A TURBINE BLADE

(75) Inventors: Michel Boquet, Ormesson sur Marne (FR); Erwan Botrel, Alfortville (FR)

(73) Assignee: SNECMA, Paris (FR)

( * ) Notice: Subject to any disclaimer, the term of this patent is extended or adjusted under 35 U.S.C. 154(b) by 1021 days.

(21) Appl. No.: 12/540,711

(22) Filed: Aug. 13, 2009

(65) Prior Publication Data
US 2010/0040475 A1    Feb. 18, 2010

(30) Foreign Application Priority Data
Aug. 13, 2008  (FR) ...................................... 08 55554

(51) Int. Cl.
*F01D 5/14*  (2006.01)
(52) U.S. Cl.
USPC ...................................... 416/243; 416/223 A (58) Field of Classification Search
USPC .................................. 416/223 A, 223 R, 243
See application file for complete search history.

(56) References Cited

U.S. PATENT DOCUMENTS
2007/0207035 A1    9/2007  Girgis et al.

FOREIGN PATENT DOCUMENTS
EP          1 707 740       10/2006

*Primary Examiner* — Edward Look
*Assistant Examiner* — Aaron R Eastman
(74) *Attorney, Agent, or Firm* — Oblon, Spivak, McClelland, Maier & Neustadt, L.L.P.

(57) ABSTRACT

When cold and in the uncoated state, the aerodynamic profile is substantially identical to a nominal profile determined by the Cartesian coordinates X, Y, Z' given in Table 1, in which the coordinate Z' is the quotient D/H where D is the distance from the point in question to a reference plane P0 situated at the base of the nominal profile and H is the height of this profile, measured from the reference plane to the tip of the blade. The measurements D and H are taken radially relative to the axis of the turbine, while the coordinate X is measured in the axial direction of the turbine.

12 Claims, 2 Drawing Sheets

FIG.1

FIG.2

OPTIMIZED AERODYNAMIC PROFILE FOR A TURBINE BLADE

The present invention relates to an aerodynamic profile for a turbine blade.

In particular, the invention relates to the aerodynamic profile of a movable rotor blade of a gas turbine and, more particularly, a high-pressure turbine of the type used in a turbojet of an aircraft.

BACKGROUND OF THE INVENTION

Such a profile must allow the turbine to produce the desired output and, for this, it must be such that the air flow around this profile is clean, that is to say substantially such that it does not cause any turbulence that is harmful to the overall output. In addition, it must withstand high mechanical stresses and allow the latter to be distributed in the blade so as to prevent premature wear of the latter. In other words, the aerodynamic profile must make it possible to optimize the aerodynamic and mechanical performances of the blade.

Furthermore, the profile must be able to be correctly installed on the root of a complete blade and be able to be manufactured without excessive difficulty. In particular, for application to turbojets, the profile must allow the installation of a cooling circuit so as to ensure the thermal integrity of the blade, that is to say to prevent zones overheating, in the field of operation of the turbojet.

The object of the invention is to propose an optimized aerodynamic profile of a turbine blade, capable of satisfying these objectives.

SUMMARY OF THE INVENTION

This object is achieved by virtue of the fact that, when cold and in the uncoated state, said profile is substantially identical to a nominal profile determined by the Cartesian coordinates X, Y, Z' given in Table 1, in which the coordinate Z' is the quotient D/H where D is the distance from the point in question to a reference plane X, Y, situated at the base of the nominal profile and H is the height of this profile, measured from said reference plane to the tip of the blade, the measurements D and H being taken radially relative to the axis of the turbine, while the coordinate X is measured in the axial direction of the turbine.

This profile has been determined after many tests and simulations. It is defined when cold, that is to say at an ambient temperature of 20° C. It is a reference temperature at which the profile is determined geometrically. The aerodynamic and mechanical optimization objectives specified above are quite clearly valid for the conditions of use of this aerodynamic profile, that is to say when hot, at a stabilized temperature at cruising speed of use of the engine of which the turbine forms part.

Moreover, the aerodynamic profile according to the invention is defined in the uncoated state. Since turbine blades must be subjected to high temperature gradients, they are frequently provided with a coating having thermal properties that allow them to withstand more easily these temperature variations. The profile is determined before such a coating is put on.

It is specified above that the profile of the invention is "substantially identical" to the nominal profile. This means that the profile may vary very slightly relative to this nominal profile.

The aerodynamic profile is therefore preferably defined in an envelope of ±1 mm in a direction normal to the surface of the nominal profile.

This variation takes account, in particular, of the manufacturing tolerances of the profile.

It is also preferable that the coordinates X, Y of the aerodynamic profile are in the range of ±5% relative to the coordinates X, Y of the nominal profile.

This variation takes account of the setup of the profile in order to adapt it to the flow originating from the guide vanes situated upstream, so as to further enhance the output of the turbine.

The invention also relates to a gas turbine, in particular a high-pressure turbine of the type used in an aircraft turbojet, fitted with a plurality of blades of the type defined above. The number of blades of the turbine is chosen to optimize the aerodynamic load per blade profile and to optimize the inter-blade flow (between the blades) in order to optimize the conversion of the kinetic energy of the fluid (gas) acting on the turbine into mechanical energy for the shaft driven by the turbine.

Preferably, the turbine comprises between 70 and 78 blades distributed evenly.

BRIEF DESCRIPTION OF THE DRAWINGS

The invention will be well understood and its advantages will be better revealed on reading the following detailed description of an embodiment represented as an example. The description refers to the appended drawings in which.

DESCRIPTION OF THE PREFERRED EMBODIMENTS

Figure 1:
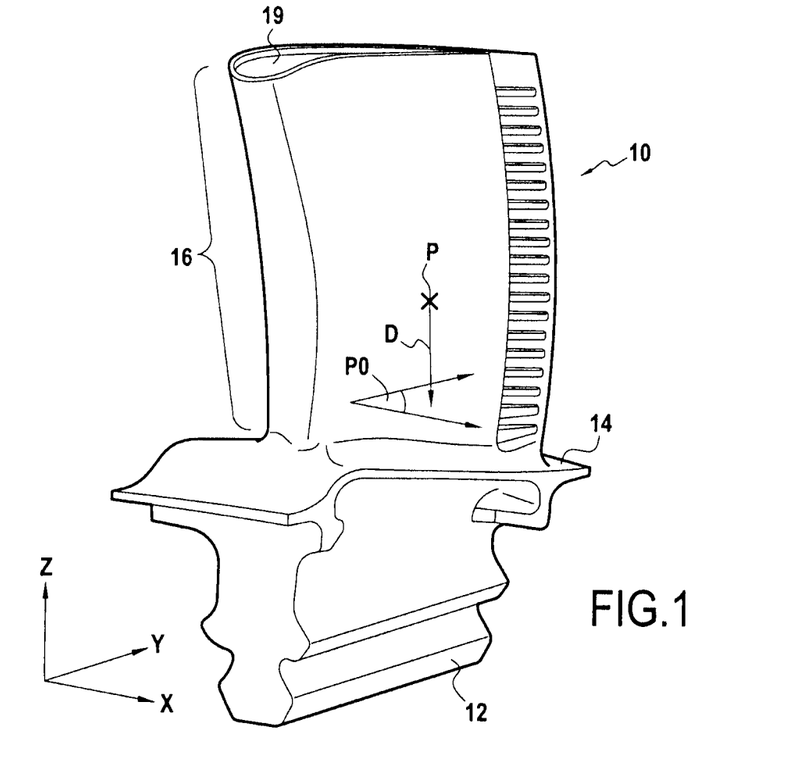
FIG 1 is a view in perspective of a blade to which the invention applies, the profile of the blade being represented only over a portion of its height.

The blade 10 shown in FIG 1 comprises a blade root 12 allowing it to be connected to the hub of a turbine rotor, and a platform 14 from which an aerodynamic profile 16 extends. By convention, the aerodynamic profile is the whole portion of the blade that extends radially outwards from the platform 14 to the tip of the blade.

In FIG 1, the Cartesian coordinate system X, Y, Z is shown. The radial direction Z is that of the height of the blade, which extends radially, from the blade root to the tip (not shown) of this blade. This direction Z is perpendicular to the axial direction X, which is that of the geometric axis of the rotor in which the blade is designed to be mounted. The direction Y is perpendicular to the plane X, Z. Since, in particular, it is a movable rotor, the direction X is that of the axis of rotation of this rotor, while the direction Y is the direction tangential to the rotation R of the rotor, the direction Z being radial.

The profile may be provided with apertures (not shown) which connect its external surface to the inside 19 of this profile, which may be hollow, in order to allow it to be cooled by air circulation.

The nominal profile from which the aerodynamic profile of the invention is determined is defined in the table of coordinates below, in which the coordinate Z', taken on the axis Z, is adimensioned and therefore varies between 0 and 1, while the dimensions X and Y, respectively taken on the axes X and Y, are expressed in millimeters.

TABLE 1

| X | Y | Z' |
|---|---|---|
| −12.704 | −1.163 | 0.000 |
| −12.729 | −1.082 | 0.000 |
| −12.760 | −0.963 | 0.000 |
| −12.791 | −0.776 | 0.000 |
| −12.776 | −0.511 | 0.000 |
| −12.744 | −0.167 | 0.000 |
| −12.628 | 0.248 | 0.000 |
| −12.421 | 0.727 | 0.000 |
| −12.117 | 1.258 | 0.000 |
| −11.699 | 1.826 | 0.000 |
| −11.174 | 2.426 | 0.000 |
| −10.562 | 3.070 | 0.000 |
| −9.867 | 3.756 | 0.000 |
| −9.084 | 4.474 | 0.000 |
| −8.204 | 5.205 | 0.000 |
| −7.218 | 5.925 | 0.000 |
| −6.121 | 6.607 | 0.000 |
| −4.912 | 7.220 | 0.000 |
| −3.595 | 7.736 | 0.000 |
| −2.183 | 8.127 | 0.000 |
| −0.694 | 8.363 | 0.000 |
| 0.848 | 8.404 | 0.000 |
| 2.405 | 8.200 | 0.000 |
| 3.922 | 7.726 | 0.000 |
| 5.334 | 6.988 | 0.000 |
| 6.609 | 6.024 | 0.000 |
| 7.732 | 4.900 | 0.000 |
| 8.711 | 3.670 | 0.000 |
| 9.561 | 2.380 | 0.000 |
| 10.302 | 1.062 | 0.000 |
| 10.948 | −0.257 | 0.000 |
| 11.518 | −1.557 | 0.000 |
| 12.028 | −2.820 | 0.000 |
| 12.503 | −4.029 | 0.000 |
| 12.959 | −5.169 | 0.000 |
| 13.400 | −6.234 | 0.000 |
| 13.819 | −7.221 | 0.000 |
| 14.212 | −8.127 | 0.000 |
| 14.574 | −8.951 | 0.000 |
| 14.905 | −9.691 | 0.000 |
| 15.201 | −10.346 | 0.000 |
| 15.463 | −10.917 | 0.000 |
| 15.690 | −11.405 | 0.000 |
| 15.883 | −11.813 | 0.000 |
| 16.042 | −12.143 | 0.000 |
| 16.169 | −12.400 | 0.000 |
| 16.183 | −12.614 | 0.000 |
| 16.122 | −12.752 | 0.000 |
| 16.059 | −12.821 | 0.000 |
| 15.999 | −12.863 | 0.000 |
| 15.952 | −12.886 | 0.000 |
| 15.886 | −12.905 | 0.000 |
| 15.778 | −12.911 | 0.000 |
| 15.630 | −12.865 | 0.000 |
| 15.481 | −12.721 | 0.000 |
| 15.338 | −12.498 | 0.000 |
| 15.160 | −12.225 | 0.000 |
| 14.944 | −11.900 | 0.000 |
| 14.690 | −11.523 | 0.000 |
| 14.393 | −11.096 | 0.000 |
| 14.049 | −10.620 | 0.000 |
| 13.655 | −10.102 | 0.000 |
| 13.206 | −9.546 | 0.000 |
| 12.697 | −8.961 | 0.000 |
| 12.123 | −8.356 | 0.000 |
| 11.481 | −7.741 | 0.000 |
| 10.767 | −7.130 | 0.000 |
| 9.982 | −6.534 | 0.000 |
| 9.125 | −5.968 | 0.000 |
| 8.199 | −5.445 | 0.000 |
| 7.211 | −4.977 | 0.000 |
| 6.170 | −4.570 | 0.000 |
| 5.086 | −4.224 | 0.000 |
| 3.973 | −3.938 | 0.000 |
| 2.841 | −3.707 | 0.000 |
| 1.700 | −3.527 | 0.000 |
| 0.560 | −3.385 | 0.000 |
| −0.570 | −3.273 | 0.000 |
| −1.683 | −3.187 | 0.000 |
| −2.773 | −3.122 | 0.000 |
| −3.832 | −3.076 | 0.000 |
| −4.855 | −3.055 | 0.000 |
| −5.837 | −3.061 | 0.000 |
| −6.771 | −3.093 | 0.000 |
| −7.652 | −3.148 | 0.000 |
| −8.478 | −3.207 | 0.000 |
| −9.246 | −3.245 | 0.000 |
| −9.951 | −3.207 | 0.000 |
| −10.578 | −3.062 | 0.000 |
| −11.112 | −2.845 | 0.000 |
| −11.548 | −2.580 | 0.000 |
| −11.897 | −2.306 | 0.000 |
| −12.172 | −2.048 | 0.000 |
| −12.375 | −1.811 | 0.000 |
| −12.511 | −1.601 | 0.000 |
| −12.599 | −1.431 | 0.000 |
| −12.654 | −1.305 | 0.000 |
| −12.685 | −1.222 | 0.000 |
| −12.704 | −1.163 | 0.000 |
| −12.219 | −1.781 | 0.099 |
| −12.254 | −1.703 | 0.099 |
| −12.300 | −1.587 | 0.099 |
| −12.354 | −1.402 | 0.099 |
| −12.379 | −1.134 | 0.099 |
| −12.386 | −0.784 | 0.099 |
| −12.305 | −0.353 | 0.099 |
| −12.139 | 0.148 | 0.099 |
| −11.877 | 0.711 | 0.099 |
| −11.512 | 1.326 | 0.099 |
| −11.047 | 1.988 | 0.099 |
| −10.495 | 2.701 | 0.099 |
| −9.858 | 3.459 | 0.099 |
| −9.127 | 4.252 | 0.099 |
| −8.292 | 5.057 | 0.099 |
| −7.341 | 5.850 | 0.099 |
| −6.266 | 6.600 | 0.099 |
| −5.066 | 7.271 | 0.099 |
| −3.743 | 7.827 | 0.099 |
| −2.312 | 8.228 | 0.099 |
| −0.796 | 8.435 | 0.099 |
| 0.769 | 8.404 | 0.099 |
| 2.332 | 8.099 | 0.099 |
| 3.833 | 7.516 | 0.099 |
| 5.220 | 6.681 | 0.099 |
| 6.466 | 5.646 | 0.099 |
| 7.570 | 4.472 | 0.099 |
| 8.544 | 3.210 | 0.099 |
| 9.402 | 1.898 | 0.099 |
| 10.162 | 0.566 | 0.099 |
| 10.837 | −0.762 | 0.099 |
| 11.441 | −2.069 | 0.099 |
| 11.990 | −3.337 | 0.099 |
| 12.502 | −4.551 | 0.099 |
| 12.988 | −5.698 | 0.099 |
| 13.451 | −6.771 | 0.099 |
| 13.887 | −7.767 | 0.099 |
| 14.293 | −8.683 | 0.099 |
| 14.665 | −9.517 | 0.099 |
| 15.002 | −10.267 | 0.099 |
| 15.302 | −10.932 | 0.099 |
| 15.566 | −11.512 | 0.099 |
| 15.792 | −12.009 | 0.099 |
| 15.981 | −12.425 | 0.099 |
| 16.135 | −12.764 | 0.099 |
| 16.253 | −13.030 | 0.099 |
| 16.271 | −13.247 | 0.099 |
| 16.211 | −13.386 | 0.099 |

TABLE 1-continued

| X | Y | Z' |
|---|---|---|
| 16.146 | −13.457 | 0.099 |
| 16.086 | −13.499 | 0.099 |
| 16.038 | −13.521 | 0.099 |
| 15.973 | −13.539 | 0.099 |
| 15.865 | −13.543 | 0.099 |
| 15.719 | −13.494 | 0.099 |
| 15.573 | −13.348 | 0.099 |
| 15.428 | −13.129 | 0.099 |
| 15.249 | −12.859 | 0.099 |
| 15.033 | −12.537 | 0.099 |
| 14.780 | −12.164 | 0.099 |
| 14.485 | −11.739 | 0.099 |
| 14.147 | −11.265 | 0.099 |
| 13.761 | −10.746 | 0.099 |
| 13.325 | −10.186 | 0.099 |
| 12.836 | −9.591 | 0.099 |
| 12.289 | −8.968 | 0.099 |
| 11.683 | −8.327 | 0.099 |
| 11.013 | −7.677 | 0.099 |
| 10.278 | −7.031 | 0.099 |
| 9.477 | −6.400 | 0.099 |
| 8.610 | −5.797 | 0.099 |
| 7.681 | −5.234 | 0.099 |
| 6.695 | −4.722 | 0.099 |
| 5.662 | −4.268 | 0.099 |
| 4.590 | −3.875 | 0.099 |
| 3.491 | −3.545 | 0.099 |
| 2.375 | −3.279 | 0.099 |
| 1.253 | −3.071 | 0.099 |
| 0.136 | −2.915 | 0.099 |
| −0.968 | −2.809 | 0.099 |
| −2.050 | −2.746 | 0.099 |
| −3.103 | −2.722 | 0.099 |
| −4.119 | −2.736 | 0.099 |
| −5.093 | −2.784 | 0.099 |
| −6.018 | −2.859 | 0.099 |
| −6.889 | −2.958 | 0.099 |
| −7.704 | −3.066 | 0.099 |
| −8.461 | −3.168 | 0.099 |
| −9.160 | −3.231 | 0.099 |
| −9.798 | −3.210 | 0.099 |
| −10.364 | −3.112 | 0.099 |
| −10.844 | −2.954 | 0.099 |
| −11.240 | −2.761 | 0.099 |
| −11.557 | −2.561 | 0.099 |
| −11.797 | −2.366 | 0.099 |
| −11.965 | −2.183 | 0.099 |
| −12.078 | −2.029 | 0.099 |
| −12.150 | −1.913 | 0.099 |
| −12.192 | −1.835 | 0.099 |
| −12.219 | −1.781 | 0.099 |
| −11.769 | −2.260 | 0.185 |
| −11.814 | −2.186 | 0.185 |
| −11.874 | −2.074 | 0.185 |
| −11.949 | −1.894 | 0.185 |
| −12.013 | −1.629 | 0.185 |
| −12.047 | −1.275 | 0.185 |
| −12.002 | −0.833 | 0.185 |
| −11.873 | −0.313 | 0.185 |
| −11.653 | 0.277 | 0.185 |
| −11.340 | 0.931 | 0.185 |
| −10.933 | 1.643 | 0.185 |
| −10.441 | 2.413 | 0.185 |
| −9.859 | 3.232 | 0.185 |
| −9.177 | 4.087 | 0.185 |
| −8.384 | 4.956 | 0.185 |
| −7.466 | 5.813 | 0.185 |
| −6.414 | 6.624 | 0.185 |
| −5.221 | 7.349 | 0.185 |
| −3.892 | 7.941 | 0.185 |
| −2.442 | 8.353 | 0.185 |
| −0.901 | 8.535 | 0.185 |
| 0.684 | 8.445 | 0.185 |
| 2.251 | 8.060 | 0.185 |
| 3.742 | 7.393 | 0.185 |
| 5.111 | 6.484 | 0.185 |
| 6.340 | 5.396 | 0.185 |
| 7.437 | 4.184 | 0.185 |
| 8.412 | 2.896 | 0.185 |
| 9.283 | 1.566 | 0.185 |
| 10.064 | 0.221 | 0.185 |
| 10.766 | −1.117 | 0.185 |
| 11.403 | −2.431 | 0.185 |
| 11.985 | −3.705 | 0.185 |
| 12.528 | −4.926 | 0.185 |
| 13.039 | −6.081 | 0.185 |
| 13.522 | −7.164 | 0.185 |
| 13.973 | −8.171 | 0.185 |
| 14.389 | −9.097 | 0.185 |
| 14.769 | −9.941 | 0.185 |
| 15.112 | −10.701 | 0.185 |
| 15.415 | −11.376 | 0.185 |
| 15.680 | −11.966 | 0.185 |
| 15.905 | −12.472 | 0.185 |
| 16.092 | −12.896 | 0.185 |
| 16.241 | −13.242 | 0.185 |
| 16.353 | −13.516 | 0.185 |
| 16.375 | −13.736 | 0.185 |
| 16.315 | −13.878 | 0.185 |
| 16.249 | −13.949 | 0.185 |
| 16.187 | −13.991 | 0.185 |
| 16.140 | −14.012 | 0.185 |
| 16.074 | −14.030 | 0.185 |
| 15.966 | −14.032 | 0.185 |
| 15.821 | −13.980 | 0.185 |
| 15.678 | −13.832 | 0.185 |
| 15.531 | −13.614 | 0.185 |
| 15.350 | −13.345 | 0.185 |
| 15.134 | −13.025 | 0.185 |
| 14.880 | −12.652 | 0.185 |
| 14.586 | −12.227 | 0.185 |
| 14.250 | −11.753 | 0.185 |
| 13.869 | −11.231 | 0.185 |
| 13.442 | −10.665 | 0.185 |
| 12.966 | −10.060 | 0.185 |
| 12.439 | −9.422 | 0.185 |
| 11.858 | −8.759 | 0.185 |
| 11.221 | −8.078 | 0.185 |
| 10.526 | −7.391 | 0.185 |
| 9.770 | −6.708 | 0.185 |
| 8.953 | −6.040 | 0.185 |
| 8.076 | −5.401 | 0.185 |
| 7.142 | −4.803 | 0.185 |
| 6.155 | −4.257 | 0.185 |
| 5.122 | −3.774 | 0.185 |
| 4.052 | −3.361 | 0.185 |
| 2.957 | −3.021 | 0.185 |
| 1.849 | −2.755 | 0.185 |
| 0.739 | −2.561 | 0.185 |
| −0.361 | −2.434 | 0.185 |
| −1.442 | −2.369 | 0.185 |
| −2.494 | −2.360 | 0.185 |
| −3.508 | −2.401 | 0.185 |
| −4.479 | −2.482 | 0.185 |
| −5.399 | −2.595 | 0.185 |
| −6.265 | −2.731 | 0.185 |
| −7.073 | −2.879 | 0.185 |
| −7.821 | −3.025 | 0.185 |
| −8.512 | −3.150 | 0.185 |
| −9.146 | −3.217 | 0.185 |
| −9.718 | −3.220 | 0.185 |
| −10.222 | −3.166 | 0.185 |
| −10.649 | −3.062 | 0.185 |
| −10.998 | −2.929 | 0.185 |
| −11.268 | −2.776 | 0.185 |
| −11.463 | −2.623 | 0.185 |
| −11.596 | −2.488 | 0.185 |
| −11.683 | −2.382 | 0.185 |
| −11.735 | −2.311 | 0.185 |
| −11.769 | −2.260 | 0.185 |
| −11.305 | −2.690 | 0.270 |
| −11.360 | −2.620 | 0.270 |
| −11.433 | −2.515 | 0.270 |
| −11.530 | −2.342 | 0.270 |
| −11.633 | −2.086 | 0.270 |
| −11.691 | −1.730 | 0.270 |

TABLE 1-continued

| X | Y | Z' |
|---|---|---|
| −11.683 | −1.280 | 0.270 |
| −11.595 | −0.743 | 0.270 |
| −11.422 | −0.129 | 0.270 |
| −11.164 | 0.560 | 0.270 |
| −10.822 | 1.318 | 0.270 |
| −10.394 | 2.140 | 0.270 |
| −9.872 | 3.015 | 0.270 |
| −9.244 | 3.928 | 0.270 |
| −8.498 | 4.859 | 0.270 |
| −7.617 | 5.779 | 0.270 |
| −6.590 | 6.651 | 0.270 |
| −5.408 | 7.429 | 0.270 |
| −4.074 | 8.059 | 0.270 |
| −2.605 | 8.483 | 0.270 |
| −1.040 | 8.644 | 0.270 |
| 0.563 | 8.501 | 0.270 |
| 2.134 | 8.045 | 0.270 |
| 3.616 | 7.306 | 0.270 |
| 4.971 | 6.337 | 0.270 |
| 6.190 | 5.203 | 0.270 |
| 7.283 | 3.958 | 0.270 |
| 8.264 | 2.646 | 0.270 |
| 9.149 | 1.298 | 0.270 |
| 9.949 | −0.060 | 0.270 |
| 10.678 | −1.408 | 0.270 |
| 11.343 | −2.731 | 0.270 |
| 11.955 | −4.013 | 0.270 |
| 12.524 | −5.242 | 0.270 |
| 13.056 | −6.407 | 0.270 |
| 13.555 | −7.501 | 0.270 |
| 14.017 | −8.519 | 0.270 |
| 14.442 | −9.458 | 0.270 |
| 14.829 | −10.313 | 0.270 |
| 15.176 | −11.084 | 0.270 |
| 15.482 | −11.769 | 0.270 |
| 15.746 | −12.369 | 0.270 |
| 15.971 | −12.883 | 0.270 |
| 16.155 | −13.316 | 0.270 |
| 16.302 | −13.669 | 0.270 |
| 16.408 | −13.949 | 0.270 |
| 16.434 | −14.171 | 0.270 |
| 16.374 | −14.316 | 0.270 |
| 16.307 | −14.388 | 0.270 |
| 16.244 | −14.430 | 0.270 |
| 16.196 | −14.451 | 0.270 |
| 16.130 | −14.468 | 0.270 |
| 16.023 | −14.468 | 0.270 |
| 15.878 | −14.414 | 0.270 |
| 15.738 | −14.263 | 0.270 |
| 15.589 | −14.045 | 0.270 |
| 15.407 | −13.777 | 0.270 |
| 15.190 | −13.457 | 0.270 |
| 14.936 | −13.084 | 0.270 |
| 14.642 | −12.658 | 0.270 |
| 14.307 | −12.181 | 0.270 |
| 13.930 | −11.656 | 0.270 |
| 13.510 | −11.084 | 0.270 |
| 13.044 | −10.469 | 0.270 |
| 12.533 | −9.818 | 0.270 |
| 11.974 | −9.134 | 0.270 |
| 11.366 | −8.426 | 0.270 |
| 10.705 | −7.704 | 0.270 |
| 9.990 | −6.976 | 0.270 |
| 9.221 | −6.253 | 0.270 |
| 8.395 | −5.546 | 0.270 |
| 7.513 | −4.870 | 0.270 |
| 6.576 | −4.241 | 0.270 |
| 5.585 | −3.673 | 0.270 |
| 4.549 | −3.179 | 0.270 |
| 3.478 | −2.766 | 0.270 |
| 2.384 | −2.440 | 0.270 |
| 1.281 | −2.203 | 0.270 |
| 0.183 | −2.051 | 0.270 |
| −0.899 | −1.978 | 0.270 |
| −1.952 | −1.977 | 0.270 |
| −2.967 | −2.038 | 0.270 |
| −3.936 | −2.149 | 0.270 |
| −4.853 | −2.296 | 0.270 |
| −5.713 | −2.468 | 0.270 |
| −6.514 | −2.653 | 0.270 |
| −7.255 | −2.840 | 0.270 |
| −7.935 | −3.013 | 0.270 |
| −8.559 | −3.148 | 0.270 |
| −9.125 | −3.240 | 0.270 |
| −9.630 | −3.285 | 0.270 |
| −10.070 | −3.283 | 0.270 |
| −10.440 | −3.227 | 0.270 |
| −10.733 | −3.125 | 0.270 |
| −10.951 | −3.005 | 0.270 |
| −11.103 | −2.891 | 0.270 |
| −11.204 | −2.799 | 0.270 |
| −11.265 | −2.736 | 0.270 |
| −11.305 | −2.690 | 0.270 |
| −10.909 | −2.923 | 0.355 |
| −10.971 | −2.859 | 0.355 |
| −11.054 | −2.759 | 0.355 |
| −11.168 | −2.595 | 0.355 |
| −11.304 | −2.351 | 0.355 |
| −11.380 | −1.995 | 0.355 |
| −11.405 | −1.541 | 0.355 |
| −11.353 | −0.994 | 0.355 |
| −11.220 | −0.363 | 0.355 |
| −11.012 | 0.350 | 0.355 |
| −10.726 | 1.140 | 0.355 |
| −10.355 | 1.999 | 0.355 |
| −9.886 | 2.916 | 0.355 |
| −9.306 | 3.873 | 0.355 |
| −8.598 | 4.849 | 0.355 |
| −7.748 | 5.814 | 0.355 |
| −6.739 | 6.727 | 0.355 |
| −5.563 | 7.539 | 0.355 |
| −4.221 | 8.188 | 0.355 |
| −2.734 | 8.606 | 0.355 |
| −1.150 | 8.733 | 0.355 |
| 0.463 | 8.531 | 0.355 |
| 2.030 | 8.007 | 0.355 |
| 3.497 | 7.201 | 0.355 |
| 4.833 | 6.180 | 0.355 |
| 6.038 | 5.006 | 0.355 |
| 7.123 | 3.732 | 0.355 |
| 8.104 | 2.398 | 0.355 |
| 8.995 | 1.035 | 0.355 |
| 9.808 | −0.334 | 0.355 |
| 10.553 | −1.691 | 0.355 |
| 11.239 | −3.020 | 0.355 |
| 11.872 | −4.308 | 0.355 |
| 12.461 | −5.543 | 0.355 |
| 13.008 | −6.715 | 0.355 |
| 13.518 | −7.817 | 0.355 |
| 13.989 | −8.844 | 0.355 |
| 14.420 | −9.791 | 0.355 |
| 14.810 | −10.655 | 0.355 |
| 15.159 | −11.434 | 0.355 |
| 15.466 | −12.128 | 0.355 |
| 15.731 | −12.734 | 0.355 |
| 15.954 | −13.256 | 0.355 |
| 16.136 | −13.694 | 0.355 |
| 16.282 | −14.052 | 0.355 |
| 16.384 | −14.337 | 0.355 |
| 16.412 | −14.561 | 0.355 |
| 16.352 | −14.707 | 0.355 |
| 16.284 | −14.781 | 0.355 |
| 16.220 | −14.823 | 0.355 |
| 16.172 | −14.843 | 0.355 |
| 16.106 | −14.860 | 0.355 |
| 15.998 | −14.859 | 0.355 |
| 15.854 | −14.803 | 0.355 |
| 15.715 | −14.649 | 0.355 |
| 15.565 | −14.432 | 0.355 |
| 15.383 | −14.163 | 0.355 |
| 15.165 | −13.842 | 0.355 |
| 14.910 | −13.468 | 0.355 |
| 14.616 | −13.041 | 0.355 |
| 14.282 | −12.561 | 0.355 |
| 13.908 | −12.032 | 0.355 |
| 13.492 | −11.454 | 0.355 |

TABLE 1-continued

| X | Y | Z' |
|---|---|---|
| 13.034 | −10.831 | 0.355 |
| 12.535 | −10.167 | 0.355 |
| 11.993 | −9.467 | 0.355 |
| 11.407 | −8.738 | 0.355 |
| 10.775 | −7.987 | 0.355 |
| 10.094 | −7.224 | 0.355 |
| 9.364 | −6.457 | 0.355 |
| 8.583 | −5.697 | 0.355 |
| 7.749 | −4.959 | 0.355 |
| 6.857 | −4.260 | 0.355 |
| 5.908 | −3.619 | 0.355 |
| 4.907 | −3.052 | 0.355 |
| 3.861 | −2.572 | 0.355 |
| 2.784 | −2.185 | 0.355 |
| 1.690 | −1.899 | 0.355 |
| 0.594 | −1.712 | 0.355 |
| −0.489 | −1.617 | 0.355 |
| −1.545 | −1.609 | 0.355 |
| −2.563 | −1.674 | 0.355 |
| −3.533 | −1.798 | 0.355 |
| −4.449 | −1.964 | 0.355 |
| −5.307 | −2.159 | 0.355 |
| −6.104 | −2.371 | 0.355 |
| −6.838 | −2.586 | 0.355 |
| −7.511 | −2.794 | 0.355 |
| −8.125 | −2.977 | 0.355 |
| −8.678 | −3.133 | 0.355 |
| −9.172 | −3.253 | 0.355 |
| −9.606 | −3.333 | 0.355 |
| −9.981 | −3.344 | 0.355 |
| −10.286 | −3.285 | 0.355 |
| −10.518 | −3.195 | 0.355 |
| −10.684 | −3.101 | 0.355 |
| −10.796 | −3.021 | 0.355 |
| −10.864 | −2.964 | 0.355 |
| −10.909 | −2.923 | 0.355 |
| −10.608 | −2.922 | 0.440 |
| −10.675 | −2.863 | 0.440 |
| −10.765 | −2.769 | 0.440 |
| −10.892 | −2.613 | 0.440 |
| −11.050 | −2.381 | 0.440 |
| −11.143 | −2.027 | 0.440 |
| −11.194 | −1.572 | 0.440 |
| −11.170 | −1.021 | 0.440 |
| −11.068 | −0.380 | 0.440 |
| −10.897 | 0.346 | 0.440 |
| −10.655 | 1.155 | 0.440 |
| −10.328 | 2.038 | 0.440 |
| −9.901 | 2.980 | 0.440 |
| −9.356 | 3.965 | 0.440 |
| −8.675 | 4.967 | 0.440 |
| −7.842 | 5.956 | 0.440 |
| −6.841 | 6.889 | 0.440 |
| −5.662 | 7.710 | 0.440 |
| −4.308 | 8.351 | 0.440 |
| −2.805 | 8.739 | 0.440 |
| −1.209 | 8.812 | 0.440 |
| 0.402 | 8.540 | 0.440 |
| 1.952 | 7.943 | 0.440 |
| 3.393 | 7.073 | 0.440 |
| 4.701 | 6.003 | 0.440 |
| 5.883 | 4.793 | 0.440 |
| 6.952 | 3.495 | 0.440 |
| 7.924 | 2.144 | 0.440 |
| 8.813 | 0.769 | 0.440 |
| 9.629 | −0.608 | 0.440 |
| 10.382 | −1.970 | 0.440 |
| 11.079 | −3.302 | 0.440 |
| 11.725 | −4.592 | 0.440 |
| 12.324 | −5.830 | 0.440 |
| 12.881 | −7.005 | 0.440 |
| 13.397 | −8.112 | 0.440 |
| 13.872 | −9.143 | 0.440 |
| 14.305 | −10.095 | 0.440 |
| 14.697 | −10.965 | 0.440 |
| 15.046 | −11.749 | 0.440 |
| 15.352 | −12.446 | 0.440 |
| 15.616 | −13.058 | 0.440 |
| 15.837 | −13.583 | 0.440 |
| 16.018 | −14.025 | 0.440 |
| 16.162 | −14.385 | 0.440 |
| 16.261 | −14.673 | 0.440 |
| 16.291 | −14.898 | 0.440 |
| 16.230 | −15.045 | 0.440 |
| 16.162 | −15.119 | 0.440 |
| 16.098 | −15.161 | 0.440 |
| 16.050 | −15.181 | 0.440 |
| 15.983 | −15.197 | 0.440 |
| 15.875 | −15.196 | 0.440 |
| 15.731 | −15.139 | 0.440 |
| 15.593 | −14.984 | 0.440 |
| 15.442 | −14.766 | 0.440 |
| 15.259 | −14.497 | 0.440 |
| 15.041 | −14.175 | 0.440 |
| 14.786 | −13.799 | 0.440 |
| 14.493 | −13.371 | 0.440 |
| 14.160 | −12.889 | 0.440 |
| 13.787 | −12.356 | 0.440 |
| 13.376 | −11.774 | 0.440 |
| 12.924 | −11.144 | 0.440 |
| 12.434 | −10.471 | 0.440 |
| 11.906 | −9.759 | 0.440 |
| 11.337 | −9.013 | 0.440 |
| 10.727 | −8.241 | 0.440 |
| 10.073 | −7.451 | 0.440 |
| 9.376 | −6.651 | 0.440 |
| 8.634 | −5.850 | 0.440 |
| 7.841 | −5.064 | 0.440 |
| 6.992 | −4.310 | 0.440 |
| 6.084 | −3.609 | 0.440 |
| 5.118 | −2.978 | 0.440 |
| 4.102 | −2.433 | 0.440 |
| 3.046 | −1.985 | 0.440 |
| 1.965 | −1.645 | 0.440 |
| 0.875 | −1.412 | 0.440 |
| −0.207 | −1.282 | 0.440 |
| −1.265 | −1.250 | 0.440 |
| −2.285 | −1.302 | 0.440 |
| −3.258 | −1.421 | 0.440 |
| −4.175 | −1.589 | 0.440 |
| −5.033 | −1.793 | 0.440 |
| −5.829 | −2.017 | 0.440 |
| −6.560 | −2.250 | 0.440 |
| −7.227 | −2.481 | 0.440 |
| −7.831 | −2.697 | 0.440 |
| −8.371 | −2.897 | 0.440 |
| −8.851 | −3.068 | 0.440 |
| −9.272 | −3.203 | 0.440 |
| −9.644 | −3.258 | 0.440 |
| −9.955 | −3.229 | 0.440 |
| −10.195 | −3.160 | 0.440 |
| −10.369 | −3.081 | 0.440 |
| −10.487 | −3.011 | 0.440 |
| −10.559 | −2.960 | 0.440 |
| −10.608 | −2.922 | 0.440 |
| −10.405 | −2.660 | 0.525 |
| −10.475 | −2.604 | 0.525 |
| −10.569 | −2.514 | 0.525 |
| −10.704 | −2.365 | 0.525 |
| −10.875 | −2.143 | 0.525 |
| −10.983 | −1.793 | 0.525 |
| −11.052 | −1.340 | 0.525 |
| −11.047 | −0.789 | 0.525 |
| −10.966 | −0.145 | 0.525 |
| −10.820 | 0.588 | 0.525 |
| −10.607 | 1.405 | 0.525 |
| −10.312 | 2.298 | 0.525 |
| −9.912 | 3.253 | 0.525 |
| −9.388 | 4.249 | 0.525 |
| −8.720 | 5.260 | 0.525 |
| −7.890 | 6.252 | 0.525 |
| −6.884 | 7.179 | 0.525 |
| −5.692 | 7.982 | 0.525 |
| −4.321 | 8.586 | 0.525 |
| −2.804 | 8.915 | 0.525 |
| −1.206 | 8.909 | 0.525 |

TABLE 1-continued

| X | Y | Z' |
|---|---|---|
| 0.389 | 8.553 | 0.525 |
| 1.907 | 7.877 | 0.525 |
| 3.309 | 6.946 | 0.525 |
| 4.580 | 5.830 | 0.525 |
| 5.729 | 4.590 | 0.525 |
| 6.773 | 3.270 | 0.525 |
| 7.727 | 1.906 | 0.525 |
| 8.603 | 0.523 | 0.525 |
| 9.413 | −0.859 | 0.525 |
| 10.163 | −2.222 | 0.525 |
| 10.861 | −3.554 | 0.525 |
| 11.510 | −4.843 | 0.525 |
| 12.114 | −6.079 | 0.525 |
| 12.673 | −7.253 | 0.525 |
| 13.190 | −8.359 | 0.525 |
| 13.665 | −9.391 | 0.525 |
| 14.097 | −10.344 | 0.525 |
| 14.487 | −11.214 | 0.525 |
| 14.834 | −11.999 | 0.525 |
| 15.138 | −12.698 | 0.525 |
| 15.399 | −13.310 | 0.525 |
| 15.618 | −13.837 | 0.525 |
| 15.797 | −14.279 | 0.525 |
| 15.940 | −14.641 | 0.525 |
| 16.039 | −14.928 | 0.525 |
| 16.067 | −15.154 | 0.525 |
| 16.006 | −15.301 | 0.525 |
| 15.938 | −15.374 | 0.525 |
| 15.874 | −15.416 | 0.525 |
| 15.825 | −15.436 | 0.525 |
| 15.759 | −15.452 | 0.525 |
| 15.651 | −15.451 | 0.525 |
| 15.507 | −15.394 | 0.525 |
| 15.369 | −15.239 | 0.525 |
| 15.218 | −15.021 | 0.525 |
| 15.036 | −14.751 | 0.525 |
| 14.818 | −14.429 | 0.525 |
| 14.564 | −14.053 | 0.525 |
| 14.271 | −13.623 | 0.525 |
| 13.940 | −13.140 | 0.525 |
| 13.570 | −12.606 | 0.525 |
| 13.162 | −12.020 | 0.525 |
| 12.716 | −11.387 | 0.525 |
| 12.234 | −10.708 | 0.525 |
| 11.715 | −9.988 | 0.525 |
| 11.160 | −9.232 | 0.525 |
| 10.567 | −8.446 | 0.525 |
| 9.935 | −7.638 | 0.525 |
| 9.264 | −6.816 | 0.525 |
| 8.553 | −5.987 | 0.525 |
| 7.796 | −5.166 | 0.525 |
| 6.986 | −4.370 | 0.525 |
| 6.118 | −3.620 | 0.525 |
| 5.191 | −2.933 | 0.525 |
| 4.210 | −2.327 | 0.525 |
| 3.182 | −1.817 | 0.525 |
| 2.122 | −1.415 | 0.525 |
| 1.045 | −1.125 | 0.525 |
| −0.029 | −0.945 | 0.525 |
| −1.085 | −0.870 | 0.525 |
| −2.107 | −0.890 | 0.525 |
| −3.083 | −0.984 | 0.525 |
| −4.003 | −1.137 | 0.525 |
| −4.863 | −1.332 | 0.525 |
| −5.659 | −1.556 | 0.525 |
| −6.389 | −1.795 | 0.525 |
| −7.052 | −2.038 | 0.525 |
| −7.648 | −2.274 | 0.525 |
| −8.178 | −2.500 | 0.525 |
| −8.646 | −2.701 | 0.525 |
| −9.057 | −2.866 | 0.525 |
| −9.425 | −2.944 | 0.525 |
| −9.736 | −2.931 | 0.525 |
| −9.980 | −2.876 | 0.525 |
| −10.158 | −2.806 | 0.525 |
| −10.279 | −2.743 | 0.525 |
| −10.355 | −2.695 | 0.525 |
| −10.405 | −2.660 | 0.525 |

TABLE 1-continued

| X | Y | Z' |
|---|---|---|
| −10.291 | −2.097 | 0.610 |
| −10.362 | −2.043 | 0.610 |
| −10.459 | −1.956 | 0.610 |
| −10.597 | −1.811 | 0.610 |
| −10.773 | −1.595 | 0.610 |
| −10.891 | −1.250 | 0.610 |
| −10.971 | −0.802 | 0.610 |
| −10.977 | −0.253 | 0.610 |
| −10.907 | 0.389 | 0.610 |
| −10.772 | 1.120 | 0.610 |
| −10.573 | 1.937 | 0.610 |
| −10.293 | 2.830 | 0.610 |
| −9.906 | 3.785 | 0.610 |
| −9.387 | 4.778 | 0.610 |
| −8.715 | 5.779 | 0.610 |
| −7.873 | 6.752 | 0.610 |
| −6.848 | 7.648 | 0.610 |
| −5.633 | 8.402 | 0.610 |
| −4.241 | 8.936 | 0.610 |
| −2.714 | 9.173 | 0.610 |
| −1.127 | 9.064 | 0.610 |
| 0.434 | 8.608 | 0.610 |
| 1.904 | 7.850 | 0.610 |
| 3.254 | 6.859 | 0.610 |
| 4.476 | 5.703 | 0.610 |
| 5.585 | 4.436 | 0.610 |
| 6.595 | 3.100 | 0.610 |
| 7.520 | 1.726 | 0.610 |
| 8.375 | 0.339 | 0.610 |
| 9.167 | −1.044 | 0.610 |
| 9.905 | −2.406 | 0.610 |
| 10.595 | −3.734 | 0.610 |
| 11.238 | −5.018 | 0.610 |
| 11.837 | −6.248 | 0.610 |
| 12.393 | −7.418 | 0.610 |
| 12.906 | −8.519 | 0.610 |
| 13.377 | −9.547 | 0.610 |
| 13.805 | −10.496 | 0.610 |
| 14.190 | −11.364 | 0.610 |
| 14.532 | −12.146 | 0.610 |
| 14.832 | −12.843 | 0.610 |
| 15.090 | −13.453 | 0.610 |
| 15.307 | −13.978 | 0.610 |
| 15.484 | −14.418 | 0.610 |
| 15.626 | −14.778 | 0.610 |
| 15.725 | −15.064 | 0.610 |
| 15.751 | −15.289 | 0.610 |
| 15.689 | −15.434 | 0.610 |
| 15.621 | −15.507 | 0.610 |
| 15.557 | −15.549 | 0.610 |
| 15.509 | −15.569 | 0.610 |
| 15.443 | −15.585 | 0.610 |
| 15.335 | −15.585 | 0.610 |
| 15.191 | −15.529 | 0.610 |
| 15.052 | −15.375 | 0.610 |
| 14.903 | −15.157 | 0.610 |
| 14.722 | −14.887 | 0.610 |
| 14.506 | −14.565 | 0.610 |
| 14.253 | −14.189 | 0.610 |
| 13.963 | −13.760 | 0.610 |
| 13.634 | −13.277 | 0.610 |
| 13.267 | −12.742 | 0.610 |
| 12.862 | −12.156 | 0.610 |
| 12.421 | −11.522 | 0.610 |
| 11.944 | −10.842 | 0.610 |
| 11.433 | −10.119 | 0.610 |
| 10.888 | −9.358 | 0.610 |
| 10.308 | −8.567 | 0.610 |
| 9.691 | −7.750 | 0.610 |
| 9.040 | −6.915 | 0.610 |
| 8.353 | −6.070 | 0.610 |
| 7.625 | −5.227 | 0.610 |
| 6.849 | −4.402 | 0.610 |
| 6.020 | −3.613 | 0.610 |
| 5.133 | −2.879 | 0.610 |
| 4.192 | −2.217 | 0.610 |
| 3.201 | −1.644 | 0.610 |
| 2.172 | −1.174 | 0.610 |

TABLE 1-continued

| X | Y | Z' |
|---|---|---|
| 1.120 | −0.815 | 0.610 |
| 0.061 | −0.568 | 0.610 |
| −0.986 | −0.431 | 0.610 |
| −2.005 | −0.396 | 0.610 |
| −2.981 | −0.445 | 0.610 |
| −3.905 | −0.562 | 0.610 |
| −4.768 | −0.732 | 0.610 |
| −5.566 | −0.941 | 0.610 |
| −6.296 | −1.173 | 0.610 |
| −6.957 | −1.416 | 0.610 |
| −7.549 | −1.660 | 0.610 |
| −8.073 | −1.895 | 0.610 |
| −8.535 | −2.106 | 0.610 |
| −8.941 | −2.278 | 0.610 |
| −9.308 | −2.362 | 0.610 |
| −9.618 | −2.354 | 0.610 |
| −9.862 | −2.303 | 0.610 |
| −10.041 | −2.237 | 0.610 |
| −10.164 | −2.176 | 0.610 |
| −10.240 | −2.131 | 0.610 |
| −10.291 | −2.097 | 0.610 |
| −10.249 | −1.190 | 0.695 |
| −10.319 | −1.137 | 0.695 |
| −10.415 | −1.051 | 0.695 |
| −10.553 | −0.908 | 0.695 |
| −10.726 | −0.693 | 0.695 |
| −10.852 | −0.355 | 0.695 |
| −10.937 | 0.089 | 0.695 |
| −10.942 | 0.633 | 0.695 |
| −10.871 | 1.269 | 0.695 |
| −10.735 | 1.992 | 0.695 |
| −10.535 | 2.800 | 0.695 |
| −10.254 | 3.684 | 0.695 |
| −9.863 | 4.627 | 0.695 |
| −9.333 | 5.602 | 0.695 |
| −8.640 | 6.575 | 0.695 |
| −7.768 | 7.506 | 0.695 |
| −6.710 | 8.342 | 0.695 |
| −5.463 | 9.014 | 0.695 |
| −4.048 | 9.442 | 0.695 |
| −2.522 | 9.554 | 0.695 |
| −0.964 | 9.318 | 0.695 |
| 0.544 | 8.752 | 0.695 |
| 1.951 | 7.911 | 0.695 |
| 3.237 | 6.863 | 0.695 |
| 4.402 | 5.671 | 0.695 |
| 5.461 | 4.382 | 0.695 |
| 6.428 | 3.034 | 0.695 |
| 7.317 | 1.655 | 0.695 |
| 8.140 | 0.266 | 0.695 |
| 8.906 | −1.115 | 0.695 |
| 9.622 | −2.472 | 0.695 |
| 10.294 | −3.794 | 0.695 |
| 10.923 | −5.070 | 0.695 |
| 11.511 | −6.292 | 0.695 |
| 12.057 | −7.453 | 0.695 |
| 12.562 | −8.546 | 0.695 |
| 13.024 | −9.565 | 0.695 |
| 13.444 | −10.508 | 0.695 |
| 13.822 | −11.369 | 0.695 |
| 14.158 | −12.146 | 0.695 |
| 14.452 | −12.837 | 0.695 |
| 14.706 | −13.442 | 0.695 |
| 14.920 | −13.962 | 0.695 |
| 15.095 | −14.399 | 0.695 |
| 15.236 | −14.755 | 0.695 |
| 15.338 | −15.037 | 0.695 |
| 15.360 | −15.260 | 0.695 |
| 15.297 | −15.403 | 0.695 |
| 15.229 | −15.475 | 0.695 |
| 15.166 | −15.517 | 0.695 |
| 15.118 | −15.537 | 0.695 |
| 15.052 | −15.554 | 0.695 |
| 14.945 | −15.554 | 0.695 |
| 14.801 | −15.501 | 0.695 |
| 14.660 | −15.350 | 0.695 |
| 14.513 | −15.132 | 0.695 |
| 14.334 | −14.863 | 0.695 |
| 14.121 | −14.541 | 0.695 |
| 13.871 | −14.166 | 0.695 |
| 13.583 | −13.738 | 0.695 |
| 13.258 | −13.257 | 0.695 |
| 12.894 | −12.723 | 0.695 |
| 12.493 | −12.139 | 0.695 |
| 12.056 | −11.507 | 0.695 |
| 11.584 | −10.829 | 0.695 |
| 11.077 | −10.108 | 0.695 |
| 10.537 | −9.349 | 0.695 |
| 9.964 | −8.558 | 0.695 |
| 9.357 | −7.741 | 0.695 |
| 8.718 | −6.903 | 0.695 |
| 8.047 | −6.052 | 0.695 |
| 7.340 | −5.198 | 0.695 |
| 6.592 | −4.355 | 0.695 |
| 5.797 | −3.539 | 0.695 |
| 4.952 | −2.767 | 0.695 |
| 4.055 | −2.055 | 0.695 |
| 3.110 | −1.420 | 0.695 |
| 2.123 | −0.878 | 0.695 |
| 1.107 | −0.440 | 0.695 |
| 0.077 | −0.111 | 0.695 |
| −0.951 | 0.107 | 0.695 |
| −1.959 | 0.219 | 0.695 |
| −2.932 | 0.238 | 0.695 |
| −3.856 | 0.178 | 0.695 |
| −4.723 | 0.051 | 0.695 |
| −5.524 | −0.126 | 0.695 |
| −6.256 | −0.338 | 0.695 |
| −6.917 | −0.570 | 0.695 |
| −7.509 | −0.806 | 0.695 |
| −8.033 | −1.033 | 0.695 |
| −8.497 | −1.235 | 0.695 |
| −8.906 | −1.395 | 0.695 |
| −9.273 | −1.467 | 0.695 |
| −9.582 | −1.453 | 0.695 |
| −9.824 | −1.398 | 0.695 |
| −10.001 | −1.331 | 0.695 |
| −10.123 | −1.269 | 0.695 |
| −10.198 | −1.224 | 0.695 |
| −10.249 | −1.190 | 0.695 |
| −10.257 | 0.096 | 0.780 |
| −10.325 | 0.150 | 0.780 |
| −10.419 | 0.236 | 0.780 |
| −10.551 | 0.380 | 0.780 |
| −10.713 | 0.600 | 0.780 |
| −10.845 | 0.931 | 0.780 |
| −10.926 | 1.369 | 0.780 |
| −10.919 | 1.906 | 0.780 |
| −10.838 | 2.532 | 0.780 |
| −10.687 | 3.243 | 0.780 |
| −10.470 | 4.036 | 0.780 |
| −10.171 | 4.901 | 0.780 |
| −9.759 | 5.820 | 0.780 |
| −9.198 | 6.762 | 0.780 |
| −8.466 | 7.686 | 0.780 |
| −7.549 | 8.548 | 0.780 |
| −6.446 | 9.293 | 0.780 |
| −5.162 | 9.848 | 0.780 |
| −3.732 | 10.134 | 0.780 |
| −2.221 | 10.094 | 0.780 |
| −0.713 | 9.715 | 0.780 |
| 0.724 | 9.034 | 0.780 |
| 2.054 | 8.111 | 0.780 |
| 3.266 | 7.011 | 0.780 |
| 4.367 | 5.788 | 0.780 |
| 5.369 | 4.481 | 0.780 |
| 6.287 | 3.125 | 0.780 |
| 7.132 | 1.743 | 0.780 |
| 7.915 | 0.355 | 0.780 |
| 8.645 | −1.022 | 0.780 |
| 9.331 | −2.373 | 0.780 |
| 9.975 | −3.686 | 0.780 |
| 10.582 | −4.953 | 0.780 |
| 11.151 | −6.165 | 0.780 |
| 11.682 | −7.314 | 0.780 |
| 12.174 | −8.396 | 0.780 |

TABLE 1-continued

| X | Y | Z' |
|---|---|---|
| 12.625 | −9.405 | 0.780 |
| 13.035 | −10.337 | 0.780 |
| 13.402 | −11.189 | 0.780 |
| 13.730 | −11.958 | 0.780 |
| 14.018 | −12.642 | 0.780 |
| 14.267 | −13.240 | 0.780 |
| 14.478 | −13.753 | 0.780 |
| 14.652 | −14.184 | 0.780 |
| 14.793 | −14.535 | 0.780 |
| 14.899 | −14.811 | 0.780 |
| 14.915 | −15.032 | 0.780 |
| 14.851 | −15.172 | 0.780 |
| 14.784 | −15.243 | 0.780 |
| 14.721 | −15.284 | 0.780 |
| 14.674 | −15.305 | 0.780 |
| 14.608 | −15.322 | 0.780 |
| 14.502 | −15.324 | 0.780 |
| 14.357 | −15.275 | 0.780 |
| 14.214 | −15.128 | 0.780 |
| 14.071 | −14.910 | 0.780 |
| 13.894 | −14.641 | 0.780 |
| 13.684 | −14.320 | 0.780 |
| 13.438 | −13.947 | 0.780 |
| 13.154 | −13.520 | 0.780 |
| 12.831 | −13.041 | 0.780 |
| 12.471 | −12.510 | 0.780 |
| 12.074 | −11.929 | 0.780 |
| 11.639 | −11.301 | 0.780 |
| 11.168 | −10.628 | 0.780 |
| 10.663 | −9.913 | 0.780 |
| 10.124 | −9.161 | 0.780 |
| 9.552 | −8.377 | 0.780 |
| 8.947 | −7.567 | 0.780 |
| 8.312 | −6.734 | 0.780 |
| 7.647 | −5.887 | 0.780 |
| 6.953 | −5.032 | 0.780 |
| 6.225 | −4.181 | 0.780 |
| 5.459 | −3.347 | 0.780 |
| 4.653 | −2.544 | 0.780 |
| 3.803 | −1.788 | 0.780 |
| 2.910 | −1.094 | 0.780 |
| 1.975 | −0.479 | 0.780 |
| 1.008 | 0.044 | 0.780 |
| 0.020 | 0.467 | 0.780 |
| −0.975 | 0.782 | 0.780 |
| −1.961 | 0.991 | 0.780 |
| −2.922 | 1.099 | 0.780 |
| −3.842 | 1.115 | 0.780 |
| −4.710 | 1.052 | 0.780 |
| −5.515 | 0.921 | 0.780 |
| −6.250 | 0.743 | 0.780 |
| −6.915 | 0.536 | 0.780 |
| −7.510 | 0.320 | 0.780 |
| −8.041 | 0.118 | 0.780 |
| −8.513 | −0.055 | 0.780 |
| −8.931 | −0.180 | 0.780 |
| −9.299 | −0.224 | 0.780 |
| −9.605 | −0.193 | 0.780 |
| −9.842 | −0.127 | 0.780 |
| −10.016 | −0.052 | 0.780 |
| −10.134 | 0.013 | 0.780 |
| −10.208 | 0.061 | 0.780 |
| −10.257 | 0.096 | 0.780 |
| −10.295 | 1.778 | 0.865 |
| −10.359 | 1.835 | 0.865 |
| −10.448 | 1.923 | 0.865 |
| −10.572 | 2.071 | 0.865 |
| −10.715 | 2.299 | 0.865 |
| −10.850 | 2.623 | 0.865 |
| −10.917 | 3.056 | 0.865 |
| −10.888 | 3.584 | 0.865 |
| −10.784 | 4.197 | 0.865 |
| −10.604 | 4.890 | 0.865 |
| −10.353 | 5.659 | 0.865 |
| −10.020 | 6.497 | 0.865 |
| −9.568 | 7.381 | 0.865 |
| −8.959 | 8.271 | 0.865 |
| −8.169 | 9.123 | 0.865 |
| −7.193 | 9.888 | 0.865 |
| −6.039 | 10.510 | 0.865 |
| −4.722 | 10.913 | 0.865 |
| −3.290 | 11.030 | 0.865 |
| −1.817 | 10.820 | 0.865 |
| −0.379 | 10.292 | 0.865 |
| 0.971 | 9.496 | 0.865 |
| 2.212 | 8.496 | 0.865 |
| 3.344 | 7.348 | 0.865 |
| 4.376 | 6.098 | 0.865 |
| 5.317 | 4.777 | 0.865 |
| 6.180 | 3.414 | 0.865 |
| 6.974 | 2.031 | 0.865 |
| 7.711 | 0.645 | 0.865 |
| 8.398 | −0.728 | 0.865 |
| 9.045 | −2.072 | 0.865 |
| 9.655 | −3.378 | 0.865 |
| 10.232 | −4.635 | 0.865 |
| 10.776 | −5.836 | 0.865 |
| 11.287 | −6.974 | 0.865 |
| 11.763 | −8.043 | 0.865 |
| 12.200 | −9.040 | 0.865 |
| 12.596 | −9.961 | 0.865 |
| 12.952 | −10.803 | 0.865 |
| 13.270 | −11.562 | 0.865 |
| 13.551 | −12.237 | 0.865 |
| 13.795 | −12.826 | 0.865 |
| 14.003 | −13.332 | 0.865 |
| 14.176 | −13.755 | 0.865 |
| 14.317 | −14.099 | 0.865 |
| 14.429 | −14.369 | 0.865 |
| 14.439 | −14.587 | 0.865 |
| 14.374 | −14.724 | 0.865 |
| 14.307 | −14.793 | 0.865 |
| 14.246 | −14.834 | 0.865 |
| 14.199 | −14.855 | 0.865 |
| 14.134 | −14.873 | 0.865 |
| 14.028 | −14.877 | 0.865 |
| 13.883 | −14.832 | 0.865 |
| 13.737 | −14.690 | 0.865 |
| 13.597 | −14.472 | 0.865 |
| 13.424 | −14.203 | 0.865 |
| 13.217 | −13.883 | 0.865 |
| 12.974 | −13.510 | 0.865 |
| 12.693 | −13.085 | 0.865 |
| 12.374 | −12.607 | 0.865 |
| 12.017 | −12.079 | 0.865 |
| 11.621 | −11.502 | 0.865 |
| 11.187 | −10.879 | 0.865 |
| 10.715 | −10.213 | 0.865 |
| 10.206 | −9.507 | 0.865 |
| 9.662 | −8.765 | 0.865 |
| 9.083 | −7.993 | 0.865 |
| 8.472 | −7.194 | 0.865 |
| 7.832 | −6.374 | 0.865 |
| 7.163 | −5.537 | 0.865 |
| 6.470 | −4.690 | 0.865 |
| 5.752 | −3.839 | 0.865 |
| 5.008 | −2.994 | 0.865 |
| 4.237 | −2.166 | 0.865 |
| 3.434 | −1.370 | 0.865 |
| 2.596 | −0.620 | 0.865 |
| 1.722 | 0.067 | 0.865 |
| 0.816 | 0.679 | 0.865 |
| −0.117 | 1.200 | 0.865 |
| −1.065 | 1.623 | 0.865 |
| −2.015 | 1.942 | 0.865 |
| −2.952 | 2.156 | 0.865 |
| −3.860 | 2.267 | 0.865 |
| −4.725 | 2.282 | 0.865 |
| −5.533 | 2.215 | 0.865 |
| −6.274 | 2.083 | 0.865 |
| −6.945 | 1.912 | 0.865 |
| −7.547 | 1.730 | 0.865 |
| −8.089 | 1.570 | 0.865 |
| −8.573 | 1.446 | 0.865 |
| −9.001 | 1.378 | 0.865 |
| −9.370 | 1.382 | 0.865 |

TABLE 1-continued

| X | Y | Z' |
|---|---|---|
| −9.670 | 1.442 | 0.865 |
| −9.899 | 1.528 | 0.865 |
| −10.065 | 1.615 | 0.865 |
| −10.178 | 1.689 | 0.865 |
| −10.248 | 1.741 | 0.865 |
| −10.295 | 1.778 | 0.865 |
| −10.306 | 3.717 | 0.951 |
| −10.366 | 3.777 | 0.951 |
| −10.450 | 3.868 | 0.951 |
| −10.563 | 4.021 | 0.951 |
| −10.683 | 4.257 | 0.951 |
| −10.825 | 4.573 | 0.951 |
| −10.867 | 5.005 | 0.951 |
| −10.812 | 5.523 | 0.951 |
| −10.679 | 6.122 | 0.951 |
| −10.462 | 6.795 | 0.951 |
| −10.172 | 7.539 | 0.951 |
| −9.796 | 8.346 | 0.951 |
| −9.296 | 9.187 | 0.951 |
| −8.628 | 10.017 | 0.951 |
| −7.775 | 10.783 | 0.951 |
| −6.740 | 11.436 | 0.951 |
| −5.540 | 11.920 | 0.951 |
| −4.202 | 12.163 | 0.951 |
| −2.786 | 12.111 | 0.951 |
| −1.365 | 11.741 | 0.951 |
| −0.006 | 11.077 | 0.951 |
| 1.252 | 10.178 | 0.951 |
| 2.402 | 9.106 | 0.951 |
| 3.455 | 7.912 | 0.951 |
| 4.418 | 6.635 | 0.951 |
| 5.300 | 5.299 | 0.951 |
| 6.108 | 3.928 | 0.951 |
| 6.852 | 2.540 | 0.951 |
| 7.542 | 1.153 | 0.951 |
| 8.185 | −0.218 | 0.951 |
| 8.791 | −1.560 | 0.951 |
| 9.365 | −2.861 | 0.951 |
| 9.910 | −4.112 | 0.951 |
| 10.428 | −5.306 | 0.951 |
| 10.919 | −6.435 | 0.951 |
| 11.378 | −7.494 | 0.951 |
| 11.802 | −8.481 | 0.951 |
| 12.187 | −9.393 | 0.951 |
| 12.532 | −10.226 | 0.951 |
| 12.841 | −10.977 | 0.951 |
| 13.115 | −11.644 | 0.951 |
| 13.354 | −12.227 | 0.951 |
| 13.560 | −12.725 | 0.951 |
| 13.733 | −13.142 | 0.951 |
| 13.876 | −13.481 | 0.951 |
| 13.995 | −13.743 | 0.951 |
| 13.999 | −13.958 | 0.951 |
| 13.933 | −14.092 | 0.951 |
| 13.867 | −14.160 | 0.951 |
| 13.806 | −14.201 | 0.951 |
| 13.760 | −14.222 | 0.951 |
| 13.695 | −14.241 | 0.951 |
| 13.590 | −14.248 | 0.951 |
| 13.443 | −14.207 | 0.951 |
| 13.294 | −14.069 | 0.951 |
| 13.157 | −13.849 | 0.951 |
| 12.986 | −13.579 | 0.951 |
| 12.782 | −13.258 | 0.951 |
| 12.541 | −12.885 | 0.951 |
| 12.263 | −12.459 | 0.951 |
| 11.946 | −11.981 | 0.951 |
| 11.589 | −11.454 | 0.951 |
| 11.192 | −10.879 | 0.951 |
| 10.755 | −10.259 | 0.951 |
| 10.278 | −9.598 | 0.951 |
| 9.762 | −8.899 | 0.951 |
| 9.208 | −8.167 | 0.951 |
| 8.618 | −7.405 | 0.951 |
| 7.995 | −6.617 | 0.951 |
| 7.342 | −5.809 | 0.951 |
| 6.663 | −4.983 | 0.951 |
| 5.964 | −4.143 | 0.951 |

TABLE 1-continued

| X | Y | Z' |
|---|---|---|
| 5.250 | −3.291 | 0.951 |
| 4.525 | −2.432 | 0.951 |
| 3.786 | −1.578 | 0.951 |
| 3.028 | −0.741 | 0.951 |
| 2.245 | 0.065 | 0.951 |
| 1.434 | 0.823 | 0.951 |
| 0.592 | 1.517 | 0.951 |
| −0.280 | 2.133 | 0.951 |
| −1.173 | 2.658 | 0.951 |
| −2.079 | 3.084 | 0.951 |
| −2.984 | 3.401 | 0.951 |
| −3.875 | 3.607 | 0.951 |
| −4.733 | 3.705 | 0.951 |
| −5.542 | 3.702 | 0.951 |
| −6.289 | 3.620 | 0.951 |
| −6.967 | 3.489 | 0.951 |
| −7.579 | 3.346 | 0.951 |
| −8.132 | 3.237 | 0.951 |
| −8.627 | 3.172 | 0.951 |
| −9.060 | 3.173 | 0.951 |
| −9.424 | 3.231 | 0.951 |
| −9.714 | 3.326 | 0.951 |
| −9.933 | 3.435 | 0.951 |
| −10.090 | 3.537 | 0.951 |
| −10.196 | 3.619 | 0.951 |
| −10.262 | 3.676 | 0.951 |
| −10.306 | 3.717 | 0.951 |
| −10.251 | 4.890 | 1.000 |
| −10.308 | 4.952 | 1.000 |
| −10.389 | 5.045 | 1.000 |
| −10.495 | 5.201 | 1.000 |
| −10.602 | 5.442 | 1.000 |
| −10.748 | 5.754 | 1.000 |
| −10.774 | 6.185 | 1.000 |
| −10.703 | 6.698 | 1.000 |
| −10.554 | 7.289 | 1.000 |
| −10.314 | 7.950 | 1.000 |
| −10.000 | 8.679 | 1.000 |
| −9.598 | 9.468 | 1.000 |
| −9.069 | 10.284 | 1.000 |
| −8.367 | 11.077 | 1.000 |
| −7.478 | 11.791 | 1.000 |
| −6.412 | 12.376 | 1.000 |
| −5.190 | 12.780 | 1.000 |
| −3.849 | 12.934 | 1.000 |
| −2.447 | 12.793 | 1.000 |
| −1.059 | 12.340 | 1.000 |
| 0.255 | 11.606 | 1.000 |
| 1.460 | 10.654 | 1.000 |
| 2.559 | 9.542 | 1.000 |
| 3.566 | 8.322 | 1.000 |
| 4.491 | 7.028 | 1.000 |
| 5.339 | 5.682 | 1.000 |
| 6.118 | 4.305 | 1.000 |
| 6.834 | 2.913 | 1.000 |
| 7.497 | 1.523 | 1.000 |
| 8.116 | 0.151 | 1.000 |
| 8.699 | −1.192 | 1.000 |
| 9.252 | −2.493 | 1.000 |
| 9.780 | −3.743 | 1.000 |
| 10.283 | −4.934 | 1.000 |
| 10.762 | −6.060 | 1.000 |
| 11.213 | −7.116 | 1.000 |
| 11.629 | −8.099 | 1.000 |
| 12.008 | −9.007 | 1.000 |
| 12.348 | −9.837 | 1.000 |
| 12.652 | −10.585 | 1.000 |
| 12.922 | −11.248 | 1.000 |
| 13.159 | −11.828 | 1.000 |
| 13.363 | −12.324 | 1.000 |
| 13.537 | −12.737 | 1.000 |
| 13.681 | −13.073 | 1.000 |
| 13.804 | −13.331 | 1.000 |
| 13.805 | −13.545 | 1.000 |
| 13.738 | −13.678 | 1.000 |
| 13.673 | −13.746 | 1.000 |
| 13.613 | −13.786 | 1.000 |
| 13.566 | −13.808 | 1.000 |

TABLE 1-continued

| X | Y | Z' |
|---|---|---|
| 13.502 | −13.827 | 1.000 |
| 13.396 | −13.835 | 1.000 |
| 13.249 | −13.796 | 1.000 |
| 13.098 | −13.660 | 1.000 |
| 12.962 | −13.439 | 1.000 |
| 12.793 | −13.168 | 1.000 |
| 12.589 | −12.845 | 1.000 |
| 12.349 | −12.471 | 1.000 |
| 12.071 | −12.043 | 1.000 |
| 11.754 | −11.565 | 1.000 |
| 11.397 | −11.037 | 1.000 |
| 10.998 | −10.462 | 1.000 |
| 10.559 | −9.842 | 1.000 |
| 10.078 | −9.182 | 1.000 |
| 9.556 | −8.486 | 1.000 |
| 8.944 | −7.758 | 1.000 |
| 8.396 | −7.001 | 1.000 |
| 7.765 | −6.219 | 1.000 |
| 7.102 | −5.416 | 1.000 |
| 6.416 | −4.594 | 1.000 |
| 5.713 | −3.755 | 1.000 |
| 5.001 | −2.899 | 1.000 |
| 4.286 | −2.031 | 1.000 |
| 3.567 | −1.157 | 1.000 |
| 2.835 | −0.295 | 1.000 |
| 2.086 | 0.544 | 1.000 |
| 1.311 | 1.341 | 1.000 |
| 0.506 | 2.081 | 1.000 |
| −0.329 | 2.746 | 1.000 |
| −1.191 | 3.326 | 1.000 |
| −2.070 | 3.808 | 1.000 |
| −2.956 | 4.180 | 1.000 |
| −3.834 | 4.438 | 1.000 |
| −4.686 | 4.580 | 1.000 |
| −5.496 | 4.614 | 1.000 |
| −6.247 | 4.560 | 1.000 |
| −6.930 | 4.451 | 1.000 |
| −7.548 | 4.331 | 1.000 |
| −8.107 | 4.252 | 1.000 |
| −8.606 | 4.223 | 1.000 |
| −9.038 | 4.264 | 1.000 |
| −9.396 | 4.354 | 1.000 |
| −9.679 | 4.468 | 1.000 |
| −9.891 | 4.590 | 1.000 |
| −10.043 | 4.700 | 1.000 |
| −10.145 | 4.788 | 1.000 |
| −10.209 | 4.848 | 1.000 |
| −10.251 | 4.890 | 1.000 |

In the table above, the plane Z'=0 corresponds to a reference plane P0 situated at the base of the profile, that is to say at the level of the platform for connection with the blade root.

As specified at the beginning of the present description, the aerodynamic profile according to the invention is substantially identical to the nominal profile defined in the table above, that is to say that it varies at most very slightly relative to this nominal profile, while being in particular defined in an envelope of ±1 mm in a direction normal to the surface of the nominal profile and/or having coordinates X, Y in the range of ±5% relative to the coordinates X, Y of the nominal profile.

The coordinates of the table above are given from a value Z'=0 in the reference plane P0. The coordinate Z' is adimensioned, that is to say that, for a point P1, situated at a distance D from the plane P0 (D is therefore measured on the axis Z), the value of Z' is D/H where H represents the total height of the profile, measured from the plane P0 to the tip of the profile. Naturally, by multiplying, in the above table, the coordinate Z' by the height H, the complete coordinates of the blade are obtained. The height H is 43 mm, ±30%.

In the table above, the profile is characterized by 13 sections with constant coordinate Z', for which the coordinates X and Y are specified. In each sectional plane with constant coordinate Z', the section of the profile is given by a continuous and smoothed curve which connects each point (X, Y). Between each sectional plane, the profile is interpolated so as to generate a homogeneous profile.

Figure 2:
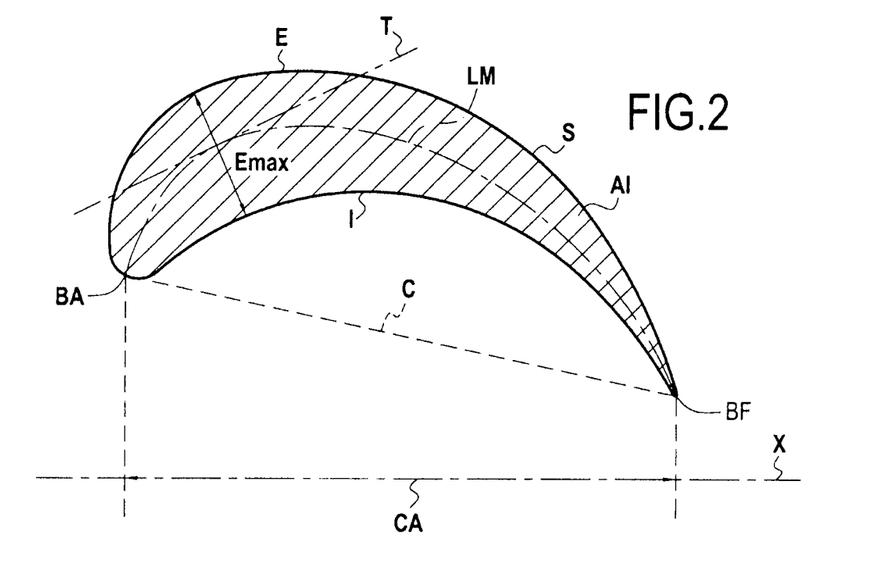
FIG 2 is a view in section of the profile of FIG 1, in a plane X, Y.

FIG 2 shows schematically a section of the profile 16 in a plane X, Y parallel to the plane P0. Indicated on this section is the leading edge BA and the trailing edge BF. In this section, the chord C of the profile is determined by the segment connecting the points BA and BF. The axial chord CA of the profile is the projection on the axis X of this segment C. Advantageously, the relationship between the adimensioned coordinate Z' and this axial chord CA for the nominal profile from which the profile according to the invention is determined is in compliance with the curve of FIG 3.

In FIG 2, the external contour of the nominal profile in the plane X, Y in question gives a continuous curve S. The internal area AI of this external contour is the area of the surface delimited by this curve S. Advantageously, the relationship between the coordinate Z' and this internal area AI for the nominal profile complies with the curve of FIG 4.

The value Emax indicated in FIG 2 is the maximum thickness of the blade profile in the plane X, Y in question. By convention, this maximum thickness is determined, in each plane X, Y, as being the length of the longest segment that orthogonally intersects a tangent T at the mean line LM of the profile. This mean line, also called the skeleton or framework, is the line formed by all the equidistant points between the suction surface E and the pressure surface I of the profile.

Figure 5:
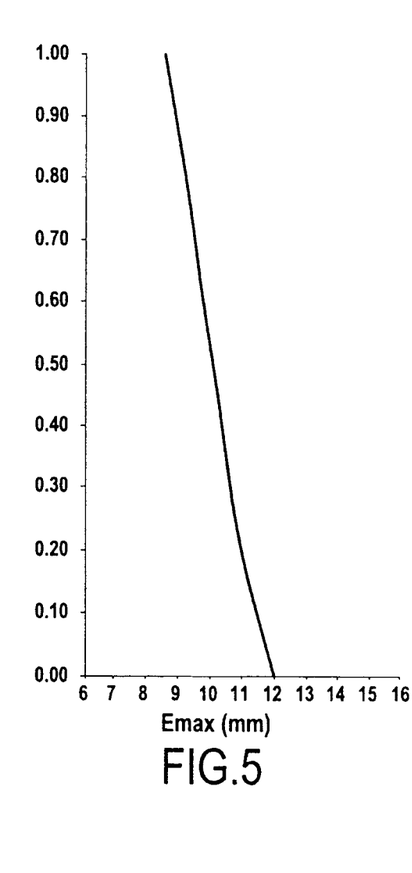
FIG 5 illustrates the relationship between the coordinate Z' and the maximum thickness of the nominal profile, measured in a plane X, Y.

Preferably, the relationship between the coordinate Z' and this maximum thickness Emax of the nominal profile complies with the curve of FIG 5.

Figure 3:
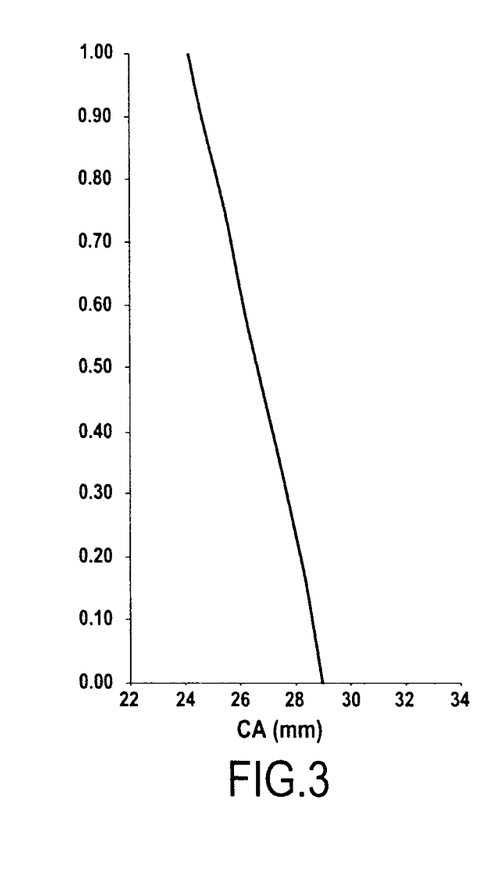
FIG 3 illustrates the relationship between the axial chord of the nominal profile and the coordinate Z'.
Figure 4:
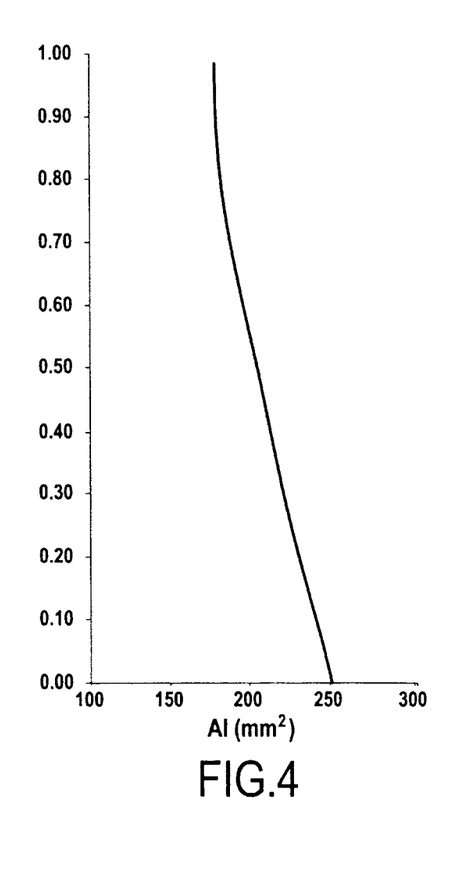
FIG 4 illustrates the relationship between the internal area defined by the external contour of the nominal profile in a plane X, Y and the coordinate Z'.

The changes to the axial chord CA, to the area AI and to the maximum thickness Emax indicated above with reference to the curves of FIGS. 3, 4 and 5 contribute to optimizing the aerodynamic profile of the invention.

A turbine blade, in particular for a movable turbine rotor, having an aerodynamic profile as defined above, with reference to Table 1 and to the curves of FIGS. 3 to 5, makes it possible to optimize the air flow in the vicinity of the aerodynamic profile and the conversion of the kinetic energy of the air thus flowing past into mechanical energy on a shaft driven by the movable rotor.

As specified above, it is advantageous that the movable rotor comprises between 70 and 78 blades having aerodynamic profiles according to the invention.

The invention claimed is:

1. A turbine blade with an aerodynamic profile,
wherein, when cold and in an uncoated state, said profile is substantially identical to a nominal profile determined by Cartesian coordinates X, Y, Z' given in Table 1, in which the coordinate Z' is a quotient D/H where D is a distance from the point in question to a reference plane P0, situated at a base of a nominal profile and H is a height of the nominal profile, measured from said reference plane to a tip of the blade, the measurements D and H being taken radially relative to an axis of a turbine, while the coordinate X is measured in an axial direction of the turbine and the height H being 43 mm ±30%.

2. A turbine blade with an aerodynamic profile,
wherein, when cold and in an uncoated state, a nominal profile of the turbine blade is determined by Cartesian coordinates X, Y, Z' given in Table 1, in which the coordinate Z' is a quotient D/H where D is a distance from the point in question to a reference plane P0, situated at a base of a nominal profile and H is a height of the nominal profile, measured from said reference plane to a tip of the blade, the measurements D and H being taken radially relative to an axis of a turbine, while the coordinate X is measured in an axial direction of the turbine and the height H being 43 mm ±30%, and wherein said aerodynamic profile is defined in an envelope of ±1 mm in a direction normal to the surface of the nominal profile.

3. A turbine blade with an aerodynamic profile, wherein, when cold and in an uncoated state, a nominal profile of the turbine blade is determined by Cartesian coordinates X, Y, Z' given in Table 1, in which the coordinate Z' is a quotient D/H where D is a distance from the point in question to a reference plane P0, situated at a base of a nominal profile and H is a height of the nominal profile, measured from said reference plane to a tip of the blade, the measurements D and H being taken radially relative to an axis of a turbine, while the coordinate X is measured in an axial direction of the turbine and the height H being 43 mm ±30%, and wherein the coordinates X, Y of said aerodynamic profile are in a range of ±5% relative to the coordinates X, Y of the nominal profile.

4. A turbine, comprising at least one turbine blade with an aerodynamic profile, wherein, when cold and in an uncoated state, said profile is substantially identical to a nominal profile determined by Cartesian coordinates X, Y, Z' given in Table 1, in which the coordinate Z' is a quotient D/H where D is a distance from the point in question to a reference plane P0, situated at a base of a nominal profile and H is a height of the nominal profile, measured from said reference plane to a tip of the blade, the measurements D and H being taken radially relative to an axis of a turbine, while the coordinate X is measured in an axial direction of the turbine and the height H being 43 mm ±30%.

5. The turbine as claimed in claim 4, comprising a movable rotor having between 70 and 78 turbine blades 6. A turbomachine, comprising a turbine having at least one turbine blade with an aerodynamic profile, wherein, when cold and in an uncoated state, said profile is substantially identical to a nominal profile determined by Cartesian coordinates X, Y, Z' given in Table 1, in which the coordinate Z' is a quotient D/H where D is a distance from the point in question to a reference plane P0, situated at a base of a nominal profile and H is a height of the nominal profile, measured from said reference plane to a tip of the blade, the measurements D and H being taken radially relative to an axis of a turbine, while the coordinate X is measured in an axial direction of the turbine and the height H being 43 mm ±30%.

7. A turbine comprising at least one turbine blade with an aerodynamic profile, wherein, when cold and in an uncoated state, a nominal profile of the turbine blade is determined by Cartesian coordinates X, Y, Z' given in Table 1, in which the coordinate Z' is a quotient D/H where D is a distance from the point in question to a reference plane P0, situated at a base of a nominal profile and H is a height of the nominal profile, measured from said reference plane to a tip of the blade, the measurements D and H being taken radially relative to an axis of a turbine, while the coordinate X is measured in an axial direction of the turbine and the height H being 43 mm ±30%, and wherein said aerodynamic profile is defined in an envelope off 1 mm in a direction normal to the surface of the nominal profile.

8. The turbine as claimed in claim 7, comprising a movable rotor having between 70 and 78 turbine blades.

9. A turbomachine, comprising a turbine having at least one turbine blade with an aerodynamic profile, wherein, when cold and in an uncoated state, a nominal profile of the turbine blade is determined by Cartesian coordinates X, Y, Z' given in Table 1, in which the coordinate Z' is a quotient D/H where D is a distance from the point in question to a reference plane P0, situated at a base of a nominal profile and H is a height of the nominal profile, measured from said reference plane to a tip of the blade, the measurements D and H being taken radially relative to an axis of a turbine, while the coordinate X is measured in an axial direction of the turbine and the height H being 43 mm ±30%, and wherein said aerodynamic profile is defined in an envelope of ±1 mm in a direction normal to the surface of the nominal profile.

10. A turbine comprising at least one turbine blade with an aerodynamic profile, wherein, when cold and in an uncoated state, a nominal profile of the turbine blade is determined by Cartesian coordinates X, Y, Z' given in Table 1, in which the coordinate Z' is a quotient D/H where D is a distance from the point in question to a reference plane P0, situated at a base of a nominal profile and H is a height of the nominal profile, measured from said reference plane to a tip of the blade, the measurements D and H being taken radially relative to an axis of a turbine, while the coordinate X is measured in an axial direction of the turbine and the height H being 43 mm ±30%, and wherein the coordinates X, Y of said aerodynamic profile are in a range off 5% relative to the coordinates X, Y of the nominal profile.

11. The turbine as claimed in claim 10, comprising a movable rotor having between 70 and 78 turbine blades.

12. A turbomachine, comprising a turbine having at least one turbine blade with an aerodynamic profile, wherein, when cold and in an uncoated state, a nominal profile of the turbine blade is determined by Cartesian coordinates X, Y, Z' given in Table 1, in which the coordinate Z' is a quotient D/H where D is a distance from the point in question to a reference plane P0, situated at a base of a nominal profile and H is a height of the nominal profile, measured from said reference plane to a tip of the blade, the measurements D and H being taken radially relative to an axis of a turbine, while the coordinate X is measured in an axial direction of the turbine and the height H being 43 mm ±30%, and wherein the coordinates X, Y of said aerodynamic profile are in a range off 5% relative to the coordinates X, Y of the nominal profile.

\* \* \* \* \*